(12) United States Patent
Michalopoulos et al.

(10) Patent No.: US 12,553,986 B2
(45) Date of Patent: Feb. 17, 2026

(54) POSITIONING IN A MOBILE COMMUNICATION SYSTEM

(71) Applicant: Nokia Technologies Oy, Espoo (FI)

(72) Inventors: Diomidis Michalopoulos, Munich (DE); Oana-Elena Barbu, Aalborg (DK)

(73) Assignee: Nokia Technologies Oy, Espoo (FI)

(*) Notice: Subject to any disclaimer, the term of this patent is extended or adjusted under 35 U.S.C. 154(b) by 508 days.

(21) Appl. No.: 17/862,823

(22) Filed: Jul. 12, 2022

(65) Prior Publication Data

US 2023/0012712 A1 Jan. 19, 2023

(30) Foreign Application Priority Data

Jul. 13, 2021 (EP) .................................... 21185255

(51) Int. Cl.
*G01S 5/02* (2010.01)
*H04W 64/00* (2009.01)

(52) U.S. Cl.
CPC ......... *G01S 5/0289* (2013.01); *H04W 64/003* (2013.01)

(58) Field of Classification Search
None
See application file for complete search history.

(56) References Cited

U.S. PATENT DOCUMENTS

| 8,577,362 | B2 | 11/2013 | Ling et al. | |
| 2019/0230618 | A1* | 7/2019 | Saur | H04W 56/001 |
| 2022/0377497 | A1* | 11/2022 | Choi | G01S 1/24 |

FOREIGN PATENT DOCUMENTS

| WO | 2020/001821 A1 | 1/2020 | | |
| WO | 2020/028517 A1 | 2/2020 | | |
| WO | WO-2020067964 A1 * | 4/2020 | ............. | G01S 1/042 |
| WO | 2020/222194 A1 | 11/2020 | | |

OTHER PUBLICATIONS

PCT Application No. PCT/EP2021/050542, "Apparatus, Method, and Computer Program", filed on Jan. 13, 2021, pp. 1-57.

(Continued)

*Primary Examiner* — Adolf Dsouza
(74) *Attorney, Agent, or Firm* — McCarter & English, LLP; Mark F. Harrington

(57) ABSTRACT

An apparatus, method and computer program comprise a user device receiving positioning signals from each of a plurality of nodes of a mobile communication system. The positioning signals can comprise first positioning signals received from each of one or more fixed nodes of the mobile communication system and second positioning signals received from each of one or more mobile nodes of the mobile communication system. The user device can determine relative angles of arrival of positioning signals between a first plurality of pairs of the nodes, and determine a collinearity indication for each of the pairs of nodes of the first plurality. Each collinearity indication can be based on the respective determined relative angles of arrival of the positioning signals. The user device can select at least some of the plurality of pairs of nodes for use in positioning refinement based, at least in part, on the determined collinearity.

18 Claims, 13 Drawing Sheets

(56) References Cited

OTHER PUBLICATIONS

"Enhancements on on-demand PRS transmissions", 3GPP TSG-RAN WG2 Meeting #113e, R2-2101868, Agenda: 8.11.2.2, Nokia, Jan. 25-Feb. 5, 2021, 5 pages.
"3rd Generation Partnership Project; Technical Specification Group Services and System Aspects; Service requirements for the 5G system; Stage 1 (Release 18)", 3GPP TS 22.261, V18.1.1, Jan. 2021, 85 pages.
"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.
"3rd Generation Partnership Project; Technical Specification Group Radio Access Network; NR; Physical layer procedures for data (Release 16)", 3GPP TS 38.214, V16.4.0, Dec. 2020, pp. 1-169.
"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.
"New SID on NR Positioning Enhancements", 3GPP TSG RAN Meeting #86, RP-193237, Agenda: 9.1.1, Qualcomm Incorporated, Dec. 9-12, 2019, 4 pages.
Langley, "Dilution of Precision", GPS World, May 1999, pp. 52-59.
Fischer, "Observed Time Diffrence of Arrival (OTDOA) Positioning in 3GPP LTE", Qualcomm Technologies, Inc, Jun. 6, 2014, pp. 1-62.
Yi et al., "Joint Positioning and Tracking via NR Sidelink in 5G-Empowered Industrial IoT: Releasing the Potential of V2X Technology", arXiv, Jan. 15, 2021, pp. 1-7.
Extended European Search Report received for corresponding European Patent Application No. 21185255.3, dated Apr. 22, 2022, 8 pages.
European Office Action for Application No. 21185255.3, dated Dec. 9, 2024, 7 pages.

* cited by examiner

POSITIONING IN A MOBILE COMMUNICATION SYSTEM

FIELD

The present specification relates to positioning in mobile communication systems.

BACKGROUND

The use of positioning signals (such as positioning reference signals) for determining a position of fixed and mobile nodes of a mobile communication system is known. However, there remains a need for further improvements in this field.

SUMMARY

In a first aspect, this specification describes an apparatus comprising means for performing: receiving, at a user device, positioning signals from each of a plurality of nodes of a mobile communication system, wherein the positioning signals comprise first positioning signals (e.g. first positioning reference signals) received from each of one or more fixed nodes of the mobile communication system and second positioning signals (e.g. second positioning reference signals) received from each of one or more mobile nodes of the mobile communication system; determining relative angles of arrival of positioning signals between a first plurality of pairs of said nodes; determining a collinearity indication for each of the pairs of nodes of the first plurality, wherein each collinearity indication is based on the respective determined relative angles of arrival of said positioning signals; and selecting (e.g. by adding and/or removing pairs to/from a candidate list) at least some of the plurality of pairs of nodes for use in determining or refining a position of the user device, wherein the selecting is based, at least in part, on the determined collinearity (e.g. relative to a threshold). The collinearity indication may be based on a binary threshold (e.g. above/below a threshold), may be based on multiple threshold, or may be a sliding scale).

Each relative angle of arrival may comprise an angle of arrival difference between: first positioning signals received from different ones of the plurality of fixed nodes; second positioning signals received from different ones of the plurality of mobile nodes; or first positioning signals received from one of the plurality of fixed nodes and second positioning signals received from one of the plurality of mobile nodes.

Selecting at least some of the plurality of pairs of nodes may comprise selecting pairs of nodes having a determined collinearity below a threshold level. Alternatively, or in addition, selecting at least some of the plurality of pairs of nodes may be based, at least in part, on received signal strength and/or position confidence. Note that position confidence level may be relevant only for mobile nodes (since the position of fixed nodes may be known precisely, i.e. with high confidence).

Some example embodiments further comprise means for performing: receiving assistance data comprising one or more of: a coarse position estimate of the user device; information identifying potential values of collinearity (e.g. geometric dilution of precision) that are above a threshold level (e.g. above a tolerable level); information identifying nodes of the mobile communication system from which positioning reference signals should be obtained/measured; information identifying pairs of nodes of the mobile communication system for which relative angles of arrival should be determined; and position confidence information (e.g. position variance) for some or all of the mobile nodes of the mobile communication system. Some or all of the said assistance data may be received from the network (e.g. from an LMF).

In some example embodiments, some or all of said mobile nodes are other user devices of the mobile communication system. Alternatively, or in addition, some or all of said fixed nodes may be transmission reception points or base stations of said mobile communication system.

In some example embodiments, said second positioning signals are provided from said mobile nodes to said user device using a direct link (e.g. sidelinks) between mobile nodes.

Some example embodiments further comprise means for performing: estimating or refining a position of the user device based on some or all of the selected pairs of nodes.

Some example embodiments further comprise means for performing: causing a first position estimate to be generated based on first positioning signals received from selected pairs of fixed nodes; and causing a second, refined, position estimate to be generated based on positioning signals from some or all of the selected pairs of nodes. The second position estimate may be based on second positioning signals received from selected pairs of mobile nodes. Some example embodiments further comprise means for performing: causing a third, further refined, position estimate, to be generated using further nodes of the plurality.

The means may comprise: at least one processor; and at least one memory including computer program code, the at least one memory and computer program code configured to, with the at least one processor, cause the performance of the apparatus.

In a second aspect, this specification describes a method comprising: receiving, at a user device, positioning signals from each of a plurality of nodes of a mobile communication system, wherein the positioning signals comprise first positioning signals received from each of one or more fixed nodes of the mobile communication system and second positioning signals received from each of one or more mobile nodes of the mobile communication system; determining relative angles of arrival of positioning signals between a first plurality of pairs of said nodes; determining a collinearity indication for each of the pairs of nodes of the first plurality, wherein each collinearity indication is based on the respective determined relative angles of arrival of said positioning signals; and selecting at least some of the plurality of pairs of nodes for use in positioning refinement, wherein the selecting is based, at least in part, on the determined collinearity.

Selecting at least some of the plurality of pairs of nodes may comprise selecting pairs of nodes having a determined collinearity below a threshold level.

Selecting at least some of the plurality of pairs of nodes may be based, at least in part, on received signal strength and/or position confidence.

The method may further comprise receiving assistance data comprising features such as one or more of: a coarse position estimate of the user device; information identifying potential values of collinearity that are above a threshold level; information identifying nodes of the mobile communication system from which positioning reference signals should be obtained; information identifying pairs of nodes of the mobile communication system for which relative angles of arrival should be determined; and position confidence information for some or all of the mobile nodes of the mobile communication system.

The second positioning signals may be provided from said mobile nodes to said user device using a direct link (e.g. sidelinks) between mobile nodes.

The method may further comprise estimating or refining a position of the user device based on some or all of the selected pairs of nodes.

The method may further comprise: causing a first position estimate to be generated based on first positioning signals received from selected pairs of fixed nodes; and causing a second, refined, position estimate to be generated based on positioning signals from some or all of the selected pairs of nodes. The method may further comprise causing a third, further refined, position estimate, to be generated using further nodes of the plurality.

In a third aspect, this specification describes an apparatus configured to perform any (at least) any method as described with reference to the second aspect.

In a fourth aspect, this specification describes computer-readable instructions which, when executed by a computing apparatus, cause the computing apparatus to perform (at least) any method as described with reference to the second aspect.

In a fifth aspect, this specification describes a computer-readable medium (such as a non-transitory computer-readable medium) comprising program instructions stored thereon for performing (at least) any method as described with reference to the second aspect.

In a sixth aspect, this specification describes an apparatus comprising: at least one processor; and at least one memory including computer program code which, when executed by the at least one processor, causes the apparatus to perform (at least) any method as described with reference to the second aspect.

In a seventh aspect, this specification describes a computer program comprising instructions for causing an apparatus to perform at least the following: receiving, at a user device, positioning signals from each of a plurality of nodes of a mobile communication system, wherein the positioning signals comprise first positioning signals received from each of one or more fixed nodes of the mobile communication system and second positioning signals received from each of one or more mobile nodes of the mobile communication system; determining relative angles of arrival of positioning signals between a first plurality of pairs of said nodes; determining a collinearity indication for each of the pairs of nodes of the first plurality, wherein each collinearity indication is based on the respective determined relative angles of arrival of said positioning signals; and selecting at least some of the plurality of pairs of nodes for use in positioning refinement, wherein the selecting is based, at least in part, on the determined collinearity.

In an eighth aspect, this specification describes an apparatus comprising: a receiver (or some other means) for receiving, at a user device, positioning signals from each of a plurality of nodes of a mobile communication system, wherein the positioning signals comprise first positioning signals (e.g. first positioning reference signals) received from each of one or more fixed nodes of the mobile communication system and second positioning signals (e.g. second positioning reference signals) received from each of one or more mobile nodes of the mobile communication system; and a processor (or some other means) for: determining relative angles of arrival of positioning signals between a first plurality of pairs of said nodes; determining a collinearity indication for each of the pairs of nodes of the first plurality, wherein each collinearity indication is based on the respective determined relative angles of arrival of said positioning signals; and selecting (e.g. by adding and/or removing pairs to/from a candidate list) at least some of the plurality of pairs of nodes for use in determining or refining a position of the user device, wherein the selecting is based, at least in part, on the determined collinearity (e.g. relative to a threshold).

BRIEF DESCRIPTION OF DRAWINGS

Example embodiments will now be described, by way of non-limiting examples, with reference to the following schematic drawings, in which.

DETAILED DESCRIPTION

Figure 1:
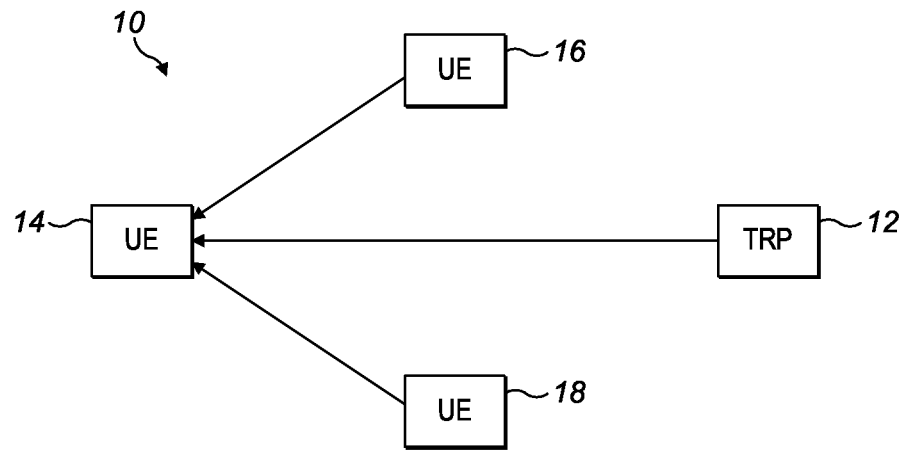
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a transmission and reception point or base station (TRP), a first user device 14, a second user device 16 and a third user device 18.

The first user device 14 receives positioning reference signals (PRS) from the TRP 12 (and may receive PRS information from other TRPs). Based on the received positioning reference signals and the known TRP location, the user device 14 is able to estimate its position (thereby performing UE-based downlink positioning).

There are many use cases where UE-based positioning is relevant, particularly related to low-latency use cases where the coordinates of the relevant user device are required to be obtained relatively quickly. One example of such use cases are Vehicle-to-everything (V2X) applications, where vehicles estimate their own location based on network measurements, and take decisions (such as whether to stop the vehicle or route change) based on such location information.

As shown in the system 10, the first user device 14 may also receive positioning information from the second and third user devices 16 and 18 (e.g. using sidelinks, or some other direct link, as discussed further below).

Figure 2:
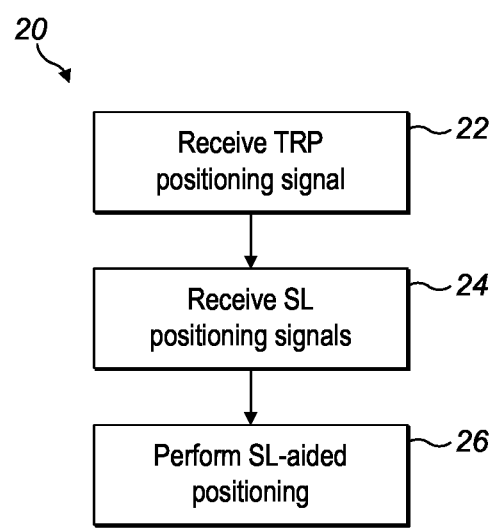
FIG. 2 is a flow chart showing a method in accordance with an example embodiment.

FIG. 2 is a flow chart showing a method, indicated generally by the reference numeral 20, in accordance with an example embodiment. The method 20 may be implemented using the system 10.

The method 20 starts at operation 22, where positioning reference signals (e.g. PRS) are received at the first user device 14 from the TRP 12, as discussed above. Next, at operation 24, sidelink (SL) positioning reference signals (or some other direct links) are received at the first user device 14 from the second and third user devices 16 and 18.

Finally, at operation 26, sidelink-aided positioning is performed (e.g. at the first user device 14) to determine an estimate of the position of the first user device 14.

Thus, the method 20 enables UE-based downlink positioning that is enhanced with sidelink (SL) assistance (i.e. SL-aided positioning).

Sidelink-aided positioning involves the use of device-to-device messaging transmitted on the so-called sidelink (SL), i.e., a direct link between user devices. Sidelink messages can be exploited to enhance the positioning process of the user device, for example, they can be used as additional reference signals measured by the user device to yield higher location estimation accuracy or to replace reference signals transmitted by fixed TRP network entities in the event that those reference signals are received at the relevant user device (e.g. the first user device 14) with very low signal power or quality.

In the system 10, the second and third user devices 16 and 18 that are assisting the positioning of the first user 14 device by transmitting reference signals in the sidelink are sometimes referred to below herein as supportive user devices (S-UEs). Similarly, the first user device 14 is sometimes referred to herein as a target user device (T-UE).

Sidelink communications may be relevant to the V2X use case referred to above, since many vehicles are using such functionality already. If sidelink channels already exist, then assisting the positioning performance with the use of sidelinks can be implemented with limited additional overhead. Sidelink communications, and sidelink-aided positioning, are useful in many other circumstances.

The use of sidelinks may also be useful for mitigating coverage errors in areas where the direct network coverage is not sufficient. For example, in V2X applications, there exist cases where the user devices/vehicles have only limited connection to the network towers (e.g. in mountain terrains where shadowing of the line of sight (LoS) signal to the base station is common). In addition, there exist additional errors to the positioning process that apply to positioning only (and not to communication), which relate to the relative geometry of the base stations with respect to the location of the target UE. For example, in case the base stations are located (approximately) along a straight line between themselves and the UE, then the accuracy of positioning may be reduced— a phenomenon sometimes referred to as geometric dilution of precision (GDOP) in satellite communications, or more generally "high collinearity". Note that the terms GDOP and collinearity are used interchangeably in this document.

Sidelink (SL) positioning is a promising technique that can allow increased levels of positioning accuracy, by leveraging the density of the multiple reference signals available for measurements at a user device (UE). Nevertheless, sidelink positioning comes with challenges; for example associated with the relative locations of the user devices, as discussed further below.

Figure 3:
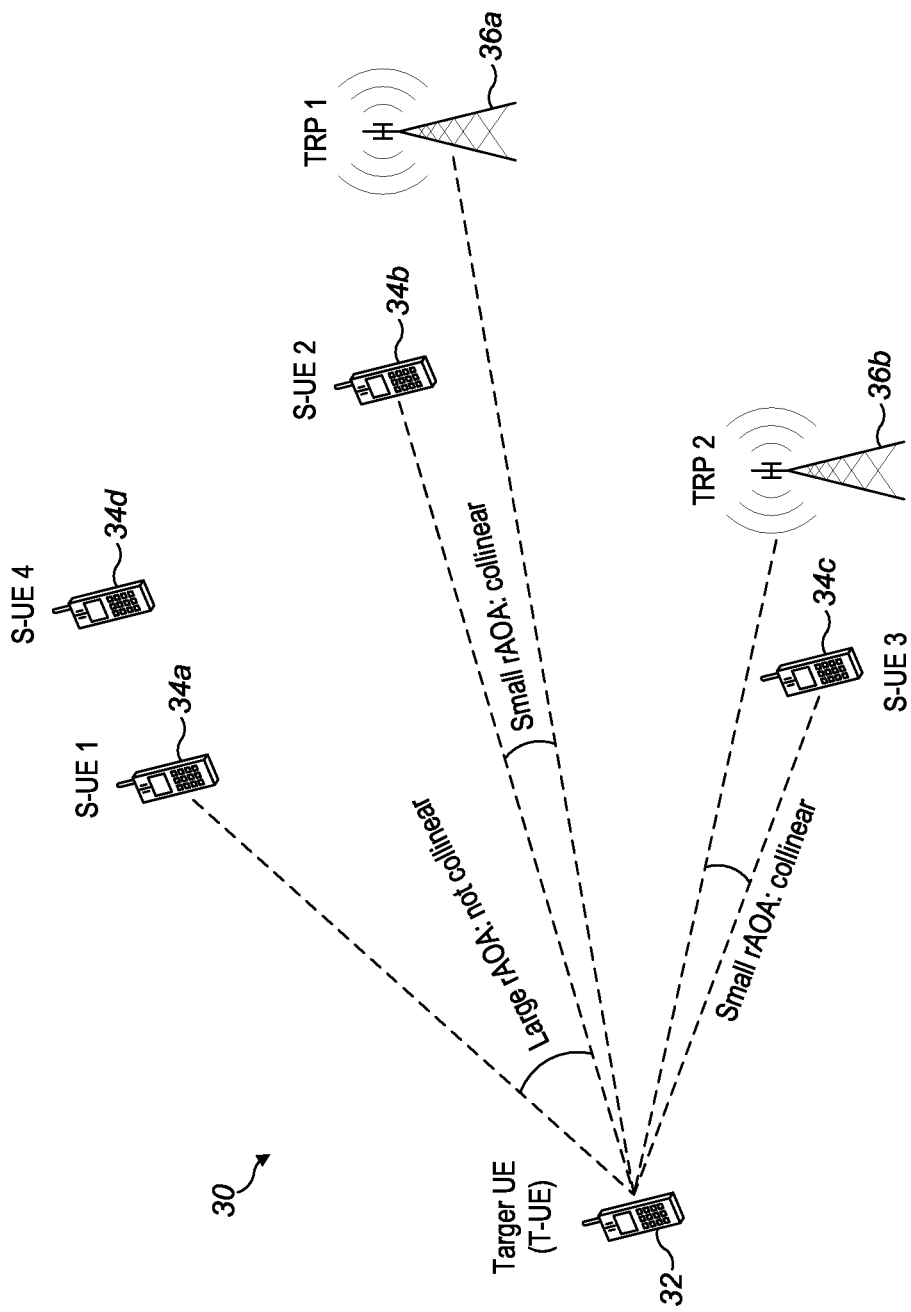
FIG. 3 is a block diagram of a system in accordance with an example embodiment.

FIG. 3 is a block diagram of a system, indicated generally by the reference numeral 30, in accordance with an example embodiment. The system 30 comprises a target user device (T-UE) 32, a first supportive user device (S-UE1) 34a, a second supportive user device (S-UE2) 34b, a third supportive user device (S-UE3) 34c, a fourth supportive user device (S-UE4) 34d, a first TRP or base station (TRP 1) 36a and a second TRP or base station (TRP 2) 36b.

As can be seen in FIG. 3, the target user device 32 is able to conduct measurements on reference signals transmitted by the TRPs 36a and 36b and the S-UEs 34a to 34d. Simply adding all involved measured signals to the positioning process would result in relatively low accuracy, since the relative geometry of some combinations of TRPs and S-UEs are (approximately) collinear when viewed from the target user device 32.

For example, in the system 30, S-UE2 34b and TRP1 36a are approximately collinear when viewed from the T-UE 32, hence due to the GDOP referred to above, including both in positioning calculations will not result in higher positioning accuracy, but will increase computational overhead. The same applies to the combination of S-UE1 34a and S-UE4 34d.

As discussed in detail below, for the target user device 32 to be able to identify which combinations of S-UEs or S-UEs and TRPs are collinear to each other, the relative angle of arrival (rAoA) is considered. For example, in the system 30, S-UE1 34a and S-UE4 34d have a relative angle of arrival at the target user device 32 which is relatively small, hence they should be assigned high collinearity. Similarly, high collinearity is assigned at the T-UE 32 for the combination of TRP1 36a and S-UE2 34b.

Moreover, the accuracy of the location estimation at the target user device 32 may also depend on the confidence level on the location of the respective S-UEs. This is because the location of the target user device can be estimated by utilizing the location of the respective S-UEs and the corresponding measurements on the sidelink channels. As a result, information on the confidence (e.g. variance of the location estimate) on the location of S-UEs may be taken into account, as discussed further below.

Figure 4:
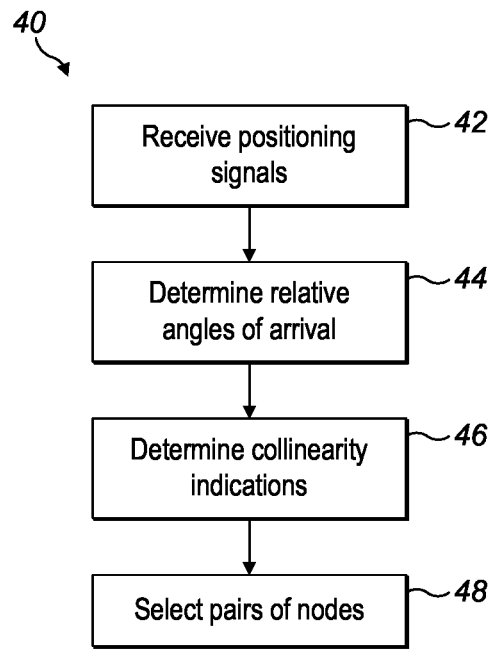
FIG. 4 is a flow chart showing a method in accordance with an example embodiment.

FIG. 4 is a flow chart showing a method, indicated generally by the reference numeral 40, in accordance with an example embodiment. The method 40 may be implemented using the system 30.

The method 40 starts at operation 42, where positioning reference signals are received at the target user device 32 from each of a plurality of nodes of a mobile communication system. The positioning reference signals include first positioning reference signals received from each of one or more fixed nodes of the mobile communication system (such as TRP1 36a and TRP2 36b) and second positioning reference signals received from each of one or more mobile nodes of the mobile communication system (such as first to fourth supportive user devices 32a-d). Some or all of said mobile nodes may be other user devices of the mobile communication system. Some or all of said fixed nodes may be transmission reception points or base stations of said mobile communication system. As discussed above, the second positioning reference signals may be provided from said mobile nodes to said user device using sidelinks.

At operation 44, relative angles of arrival of positioning reference signals between a first plurality of pairs of said nodes are determined.

At operation 46, a collinearity indication for each of the pairs of nodes of the first plurality is determined, wherein each collinearity indication is based on the respective determined relative angles of arrival of said positioning reference signals. The collinearity indication may be a binary indication (e.g. whether the degree of collinearity is above or below a threshold). Alternatively, the collinearity indication may be based on multiple threshold, be based on a sliding scale, or be expressed in some other way.

At operation 48, at least some of the plurality of pairs of nodes are selected for use in determining or refining a position of the target user device, wherein the selecting is based, at least in part, on the collinearity determined in operation 46 (e.g. whether the collinearity is above or below a threshold). The pairs of nodes may be selected in the operation 48 by adding and/or removing pairs of nodes from a candidate list, as discussed in detail below.

Figure 5:
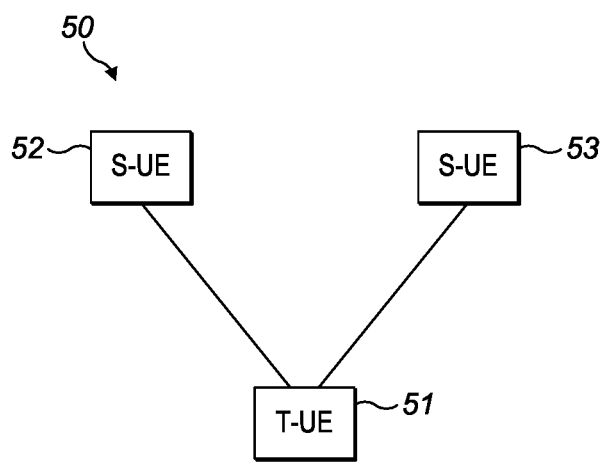
FIGS. 5 to 10 are block diagrams of systems in accordance with example embodiments.

FIG. 5 is a block diagram of a system, indicated generally by the reference numeral 50, in accordance with an example embodiment. The system 50 comprises a target user device 51, a first supportive user device 52 and a second supportive user device 53. In the system 50, the target user device 51 receives positioning reference signals (e.g. PRS) from different ones of the plurality of mobile nodes (in this case the first supportive user device 52 and the second supportive user device 53). A relative angle of arrival can therefore be determined based on difference between angles of arrival of the corresponding positioning reference signals with respect to a common orientation direction (e.g. the boresight direction of the target user device 51), as indicated in FIG. 5.

Figure 6:
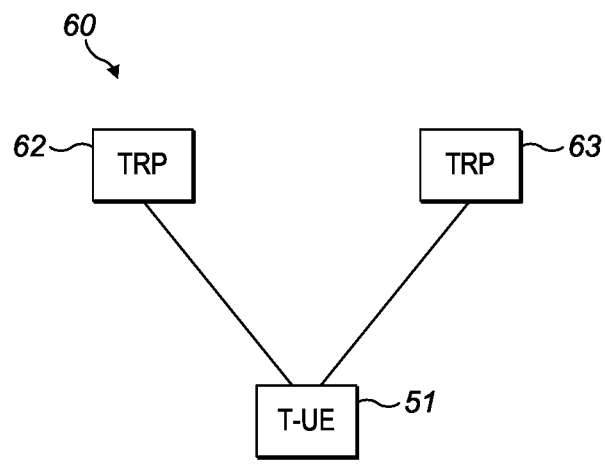

FIG. 6 is a block diagram of a system, indicated generally by the reference numeral 60, in accordance with an example embodiment. The system 60 comprises the target user device 51, a first TRP 62 and a second TRP 63. In the system 60, the target user device 51 receives positioning reference signals (e.g. PRS) from different ones of the plurality of fixed nodes (in this case the first TRP 62 and the second TRP 63). A relative angle of arrival can therefore be determined based on an angle of arrival difference between the received positioning reference signals, as indicated in FIG. 6.

Figure 7:
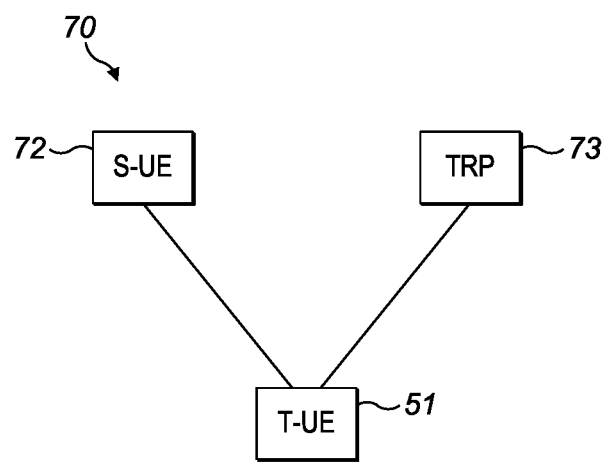

FIG. 7 is a block diagram of a system, indicated generally by the reference numeral 70, in accordance with an example embodiment. The system 70 comprises the target user device 51, a supportive user device 72 and a TRP 73. In the system 70, the target user device 51 receives positioning reference signals (e.g. PRS) from one of a plurality of mobile nodes (in this case the supportive user device 72) and one of a plurality of fixed nodes (in this case the TRP 73). A relative angle of arrival can therefore be determined based on an angle of arrival difference between the received positioning reference signals, as indicated in FIG. 7.

Figure 8:
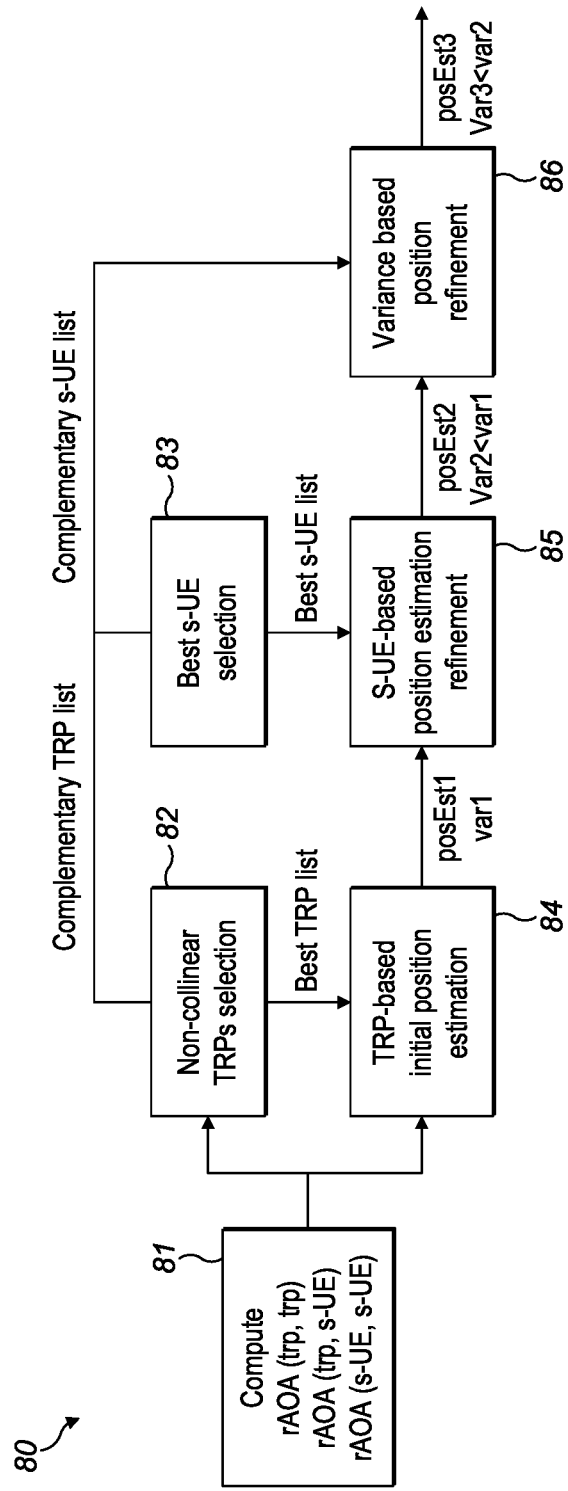

FIG. 8 is a block diagram of a system, indicated generally by the reference numeral 80, in accordance with an example embodiment. The system 80 comprises a computation module 81, a non-collinear selection module 82, a supportive user device (S-UE) selection module 83, an initial position estimation module 84, a first position refinement module 85 and a second position refinement module 86. The system 80 may be implemented at a user device (such as the target user devices 32 or 51 described above), although this is not essential to all example embodiments.

The computation module 81 computes the relative angle of arrival between pairs of transmitters (e.g. pairs of supportive user devices, pairs of static TRPs or combinations of a supportive user device and a TRP, as described above with reference to FIGS. 5 to 7).

The non-collinear selection module 82 uses the relative angles of arrival between TRPs to select a first set of non-collinear TRPs for use in position estimation. Similarly, the supportive user device selection module 83 uses the relative angles of arrival between pairs of supportive user devices and between TRPs and supportive user device to select supportive user devices for use in position estimation.

The first set of non-collinear TRPs selected by the non-collinear selection module 82 are used by the initial position estimation module 84 to determine a first soft position estimate. As shown in FIG. 8, that first soft position estimate may include a mean position (posEst1) and a variance (Var1). An example estimator is a maximum aposteriori (MAP) estimator that uses the subset of TRPs ID, their position and the received signal samples, and returns the soft estimate (posEst1, Var1).

The supportive user devices selected by the user device selection module 83 are used by the first position refinement module 85 to refine the position estimate generated by the initial position estimation module 83. As shown in FIG. 8, that refined position estimate may include a mean position (posEst2) and a variance (Var2). The refinement module 85 may, for example, continue to refine the position whilst the variance is reducing (i.e. Var2<Var1).

Finally, the second position refinement module 86 may, in some example embodiments, be used to generate a further refinement of the position estimate.

Figure 9:
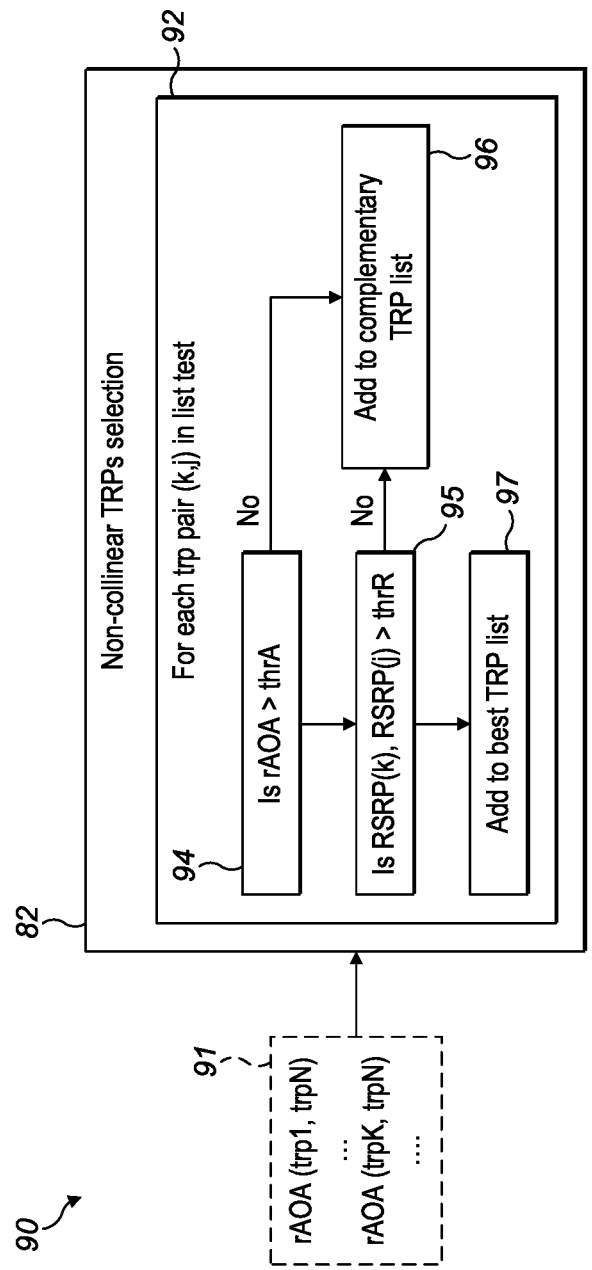

FIG. 9 is a block diagram of a system, indicated generally by the reference numeral 90, in accordance with an example embodiment. Thus system 90 includes the non-collinear selection module 82 discussed above and implements an algorithm 92.

In the system 90, the non-collinear selection module 82 receives relative angle of arrival data 91 between pairs of TRPs. The data 91 is a subset of the data generated by the computation module 81 (i.e. the angle of arrival data relating to the TRP pairs only).

The algorithm 92 starts at operation 94, where the relative angle of arrival of each of the TRPs pairs included in the data 91 is compared with a collinearity threshold (thrA). The collinearity threshold may be predefined by the user device itself, signalled by the network or set in some other way. By way of example, the collinearity threshold thrA may be $\pi/7$ rad.

If the relative angle of arrival for a particular pair of TRPs is above the collinearity threshold (indicating that the TRPs may be useful for positioning), then the algorithm moves to operation 95. Otherwise, the algorithm 92 terminates at operation 96, where the TRP pair is added to a complementary TRP list (discussed further below).

At operation 95, the signal strength (e.g. reference signal received power—RSRP) of each of the TRP signals of the TRP pair (indicated as RSRP(k) and RSRP(j) in FIG. 9) are compared with a threshold signal strength (e.g. an RSRP threshold, thrR). As with the collinearity threshold, the RSRP threshold (thrR) may be predefined by the user device itself, signalled by the network or set in some other way. By way of example, the RSRP threshold thrR may be −50 dBm, −70 dBm etc. Note that SNR, RSSI or some other signal quality metric may be used instead or in addition to RSRP.

If the signal strength for each TRP of a particular pair is above the RSRP threshold (indicating that the TRPs may be useful for positioning), then the algorithm moves to operation 97. Otherwise, the algorithm 92 terminates at the operation 96, where the TRP pair is added to a complementary TRP list (discussed further below).

At operation 97, the TRPs having relative angles of arrival above the threshold thrA and signal strengths above the threshold thrR are added to a "best TRP list" of TRPs that may be used to generate the first soft position estimate (posEst1, Var).

Thus, in the algorithm 92, the user device evaluates each TRP pair (k,j) for several fitness criteria. This includes (but is not limited to) collinearity. Note those other fitness criteria (not described above) could be considered. The selected TRP pairs can be used to generate a first position estimate.

Figure 10:
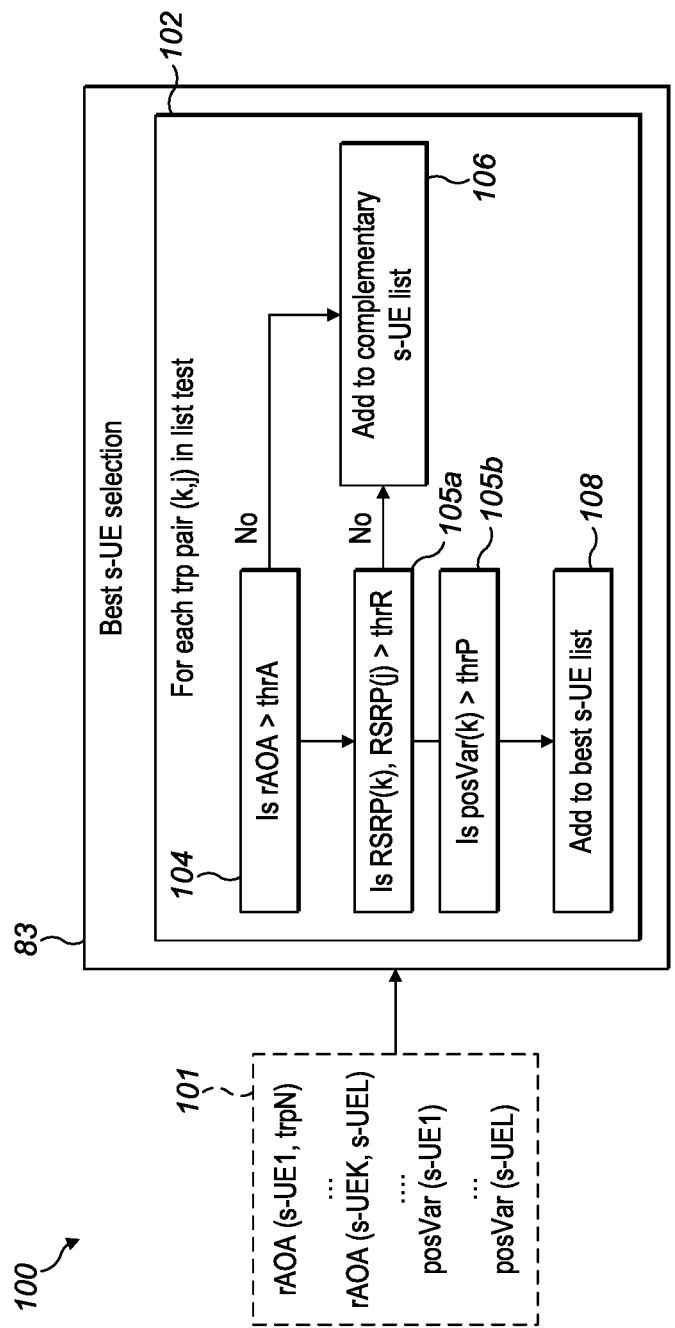

FIG. 10 is a block diagram of a system, indicated generally by the reference numeral 100, in accordance with an example embodiment. The system 100 includes the supportive user device selection module 83 discussed above and implements an algorithm 102.

In the system 100, the user device selection module 83 receives relative angle of arrival data 101 between pairs of supportive user devices and between user devices and TRPs. The data 101 is a subset of the data generated by the computation module 81 (i.e. omitting the angle of arrival data relating to the pairs of TRPs).

The algorithm 102 starts at operation 104, where the relative angle of arrival each of the pairs included in the data 101 is compared with a second collinearity threshold (thrA). The collinearity threshold may be predefined by the user device itself, signalled by the network or set in some other way. The second collinearity threshold may be the same as the first collinearity threshold, but this is not essential to all example embodiments; thus, the first and second collinearity thresholds may be different.

If the relative angle of arrival for a particular data pair is above the second collinearity threshold (indicating that the data pair may be useful for positioning), then the algorithm moves to operation 105. Otherwise, the algorithm 102 terminates at operation 106, where the supportive user device(s) of the pair are added to a complementary supportive user device list (discussed further below).

If the pair is deemed (in the operation 104) to be non-collinear, one or more other parameters (e.g. relating to signal quality) may be considered. For example, the signal strength (e.g. RSRP) of each of a pair may be compared with an RSRP threshold (thrR) as indicated in the operation 105a. Alternatively, or in addition, the accuracy of the position of a supportive user device may be considered (e.g. the position variance may be compared to a threshold variance thrP, as indicated in the operation 105b).

If all conditions are fulfilled, the pair is deemed as fit for contributing to the position refinement and added, in operation 108, to a "best s-UE list". Otherwise, the pair is added, in operation 106, to the complementary S-UE list.

Using the selected S-UE in the best S-UE list generated in the operation 108, the initial position posEst1 described above refined and a second soft position estimate is returned: (posEst2, Var2), where Var2<Var1.

Thus, the system 80 can be used to implement a hierarchical position refinement procedure. The system 80 can be configured to take into account both the relative angles of arrivals of signals from supportive user devices and/or TRPs or base stations of a mobile communication system, as well as the confidence level of locations of S-UEs (e.g. the variance of the S-UE position estimates).

Figure 11:
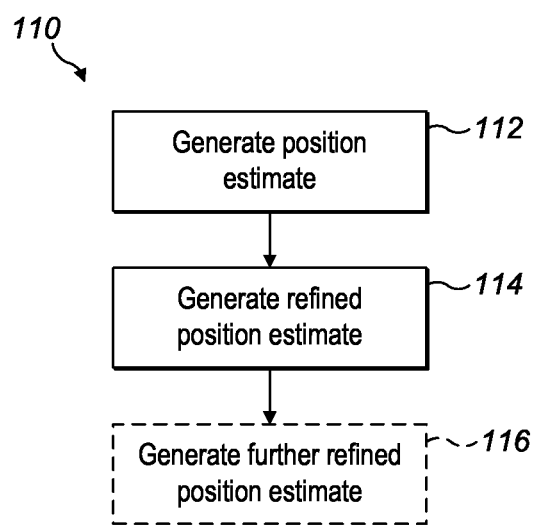
FIG. 11 is a flow chart showing a method in accordance with an example embodiment.

FIG. 11 is a flow chart showing a method, indicated generally by the reference numeral 110, in accordance with an example embodiment. The method 110 may be implemented by the system 80 described above.

The method 110 starts at operation 112, where a first position estimate is generated. The first position estimate may be generated based on first positioning reference signals received from selected pairs of fixed nodes (e.g. TRPs) of a mobile communication system.

At operation 114, a second, refined, position estimate is generated based on second positioning reference signals from some or all of a selected pairs of mobile nodes of the mobile communication system.

As discussed further below, in an optional operation 116, a third, further refined, position estimate, may be generated based on further nodes of the fixed and mobile nodes of the mobile communication system (e.g. nodes that were not selected for use in the operations 112 or 114).

Figure 12:
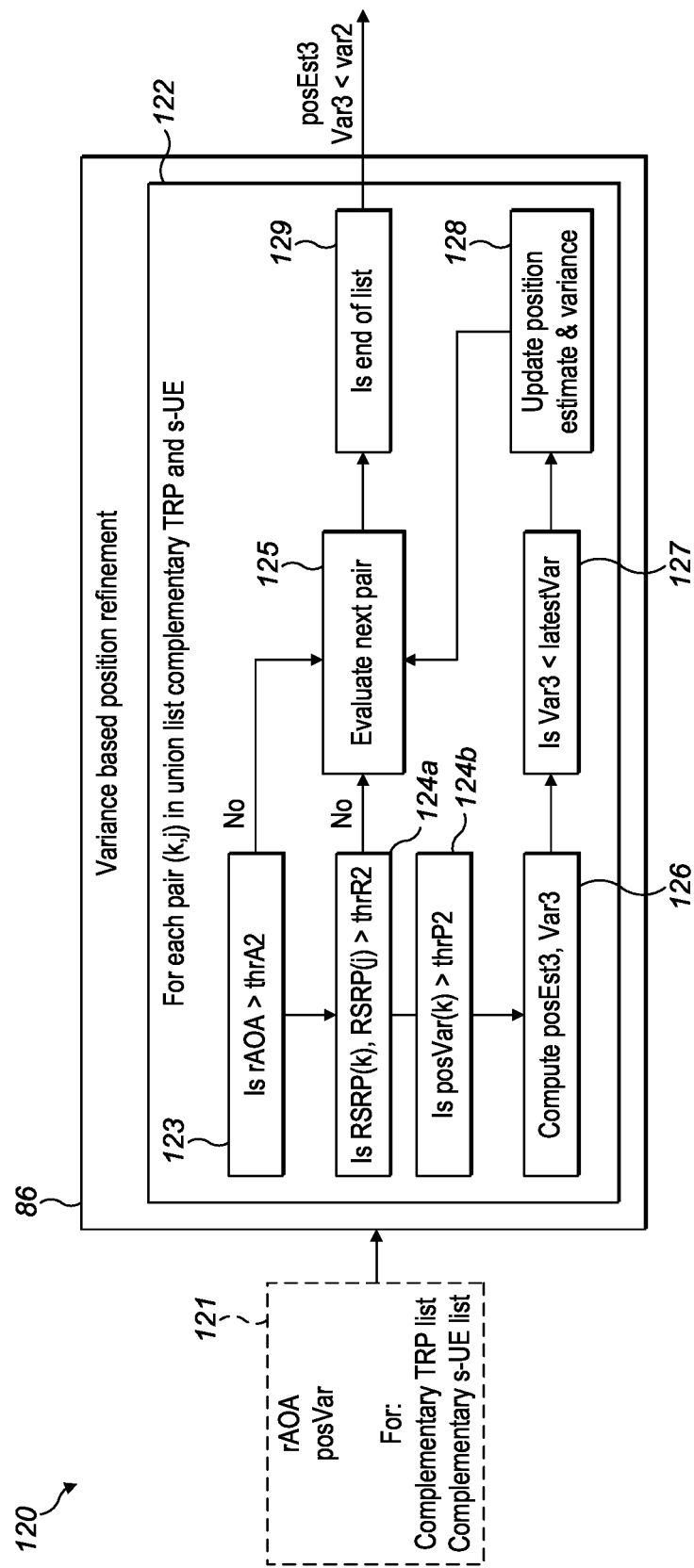
FIGS. 12 to 16 are block diagrams of systems in accordance with example embodiments.

FIG. 12 is a block diagram of a system, indicated generally by the reference numeral 120, in accordance with an example embodiment. The system 120 includes the second position refinement module 86 discussed above and implements an algorithm 122. The system 120 may be used to implement the operation 116 of the method 110 described above.

In the system 120, the second position refinement module 86 receives relative angle of arrival and position variance data 121 for the TRPs and supportive user devices of the complementary lists generated in the operations 96 and 106 described above.

In the algorithm 122, the supportive user devices and the TRPs of the data 101 are sequentially evaluated and used for position refinement.

The algorithm 122 starts at operation 123, where for a particular pair of fixed or mobile nodes (e.g. TRPs/user devices), the relative angle of arrival is compared to a further collinearity threshold thrA2 (that is less strict than the first collinearity threshold thrA). The collinearity threshold may be predefined by the user device itself, signalled by the network or set in some other way.

If the relative angle of arrival for a particular data pair is above the further collinearity threshold (indicating that the data pair may be useful for positioning), then the algorithm moves to operation 124a. Otherwise, the algorithm 122 moves to operation 125, where the next data pair is considered.

If the pair is deemed (in the operation 123) to be non-collinear, one or more other parameters (e.g. relating to signal quality) may be considered. For example, the signal strength (e.g. RSRP) of each of a pair may be compared with a second RSRP threshold (thrR2) as indicated in the operation 124a. Alternatively, or in addition, the accuracy of the position of a supportive user device may be considered (e.g. the position variance may be compared to a second threshold variance thrP2, as indicated in the operation 124b). Note that the second RSRP threshold and the second variance threshold may be less strict that the first RSRP threshold and first variance threshold described above respectively.

If all conditions are fulfilled, then a final target UE position is computed, i.e. (posEst3, Var3) in operation 126.

At operation 127, it is determined whether Var3<Var2 (indicating that data pair helped reduced the variance). If so, the user device position is updated in operation 128. Otherwise, the pair is discarded and the method evaluates next TX pair (operation 125).

Figure 13:
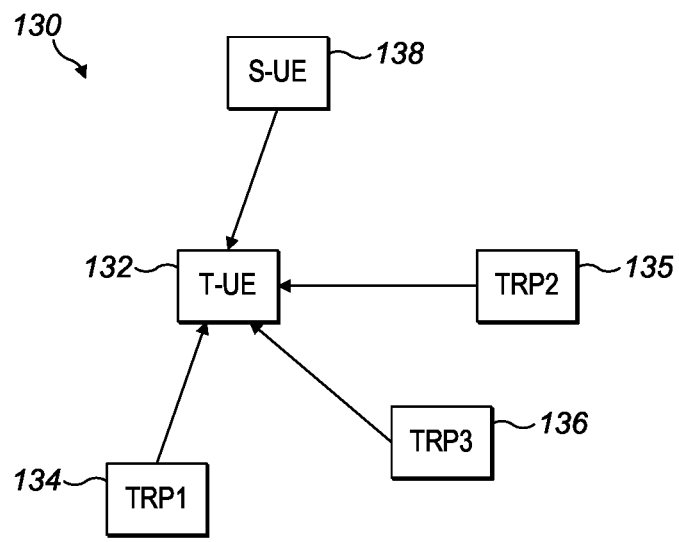

FIG. 13 is a block diagram of a system, indicated generally by the reference numeral 130, in accordance with an example embodiment. The system comprises a target user device 132, first, second and third TRPs 135 to 136 and a supportive user device 138. Each of the TRPs and the supportive user device provide positioning reference signals (PRS) to the target user device 132 that could be used for estimating a position of the target user device.

The method 110 described above may be used by the target user device 132 to estimate its position.

A first position estimate is generated in the operation 112 of the method 110. The first position estimate may be generated based on first positioning reference signals received from selected pairs of fixed nodes (e.g. TRPs) of a mobile communication system. For example, data from one or both of the second and third TRPs 135 and 136 may be omitted if those TRPs are considered to be collinear.

At operation 114 of the method 110, a second, refined, position estimate is generated based on second positioning reference signals from the mobile (supportive) node 138.

At operation 116 of the method 110, a third, further refined, position estimate is generated based on further nodes of the fixed and mobile nodes of the mobile communication system (e.g. nodes, such TRP12 and/or TR3 that were not selected for use in the operation 112).

Figure 14:
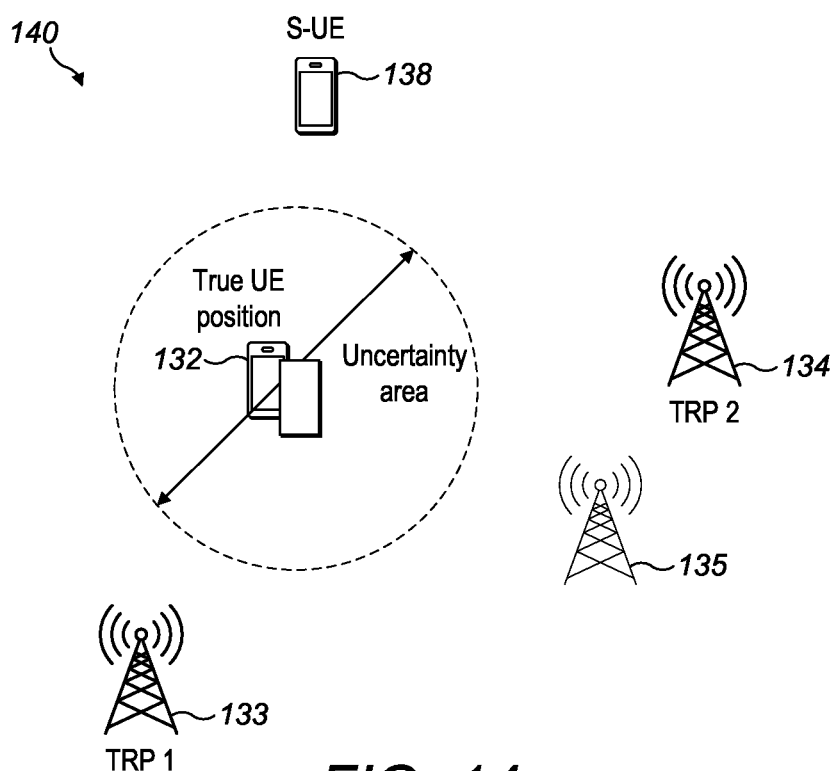
Figure 15:
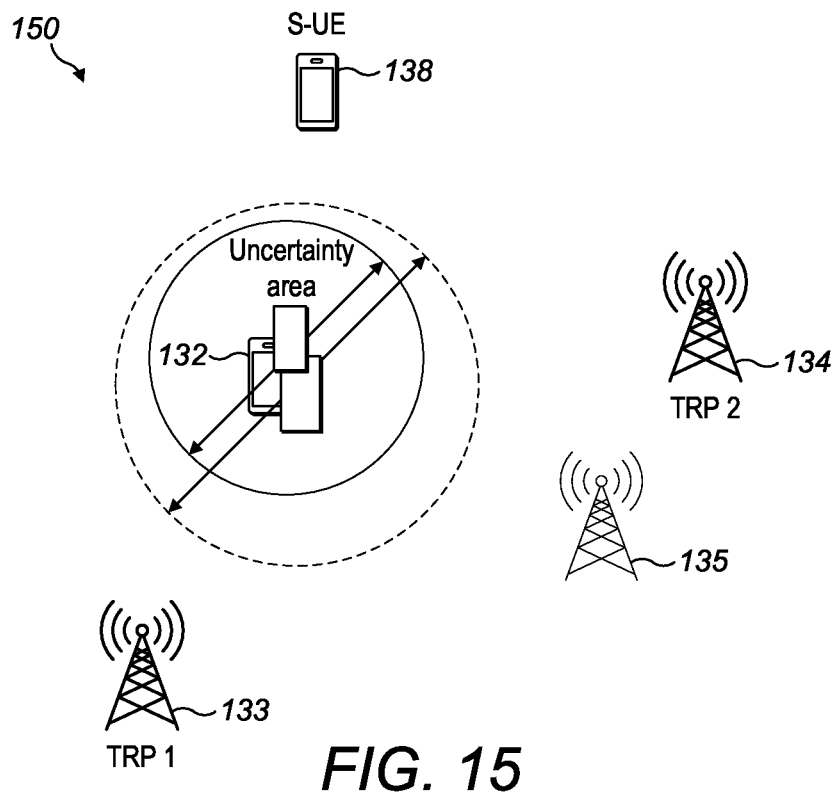
Figure 16:
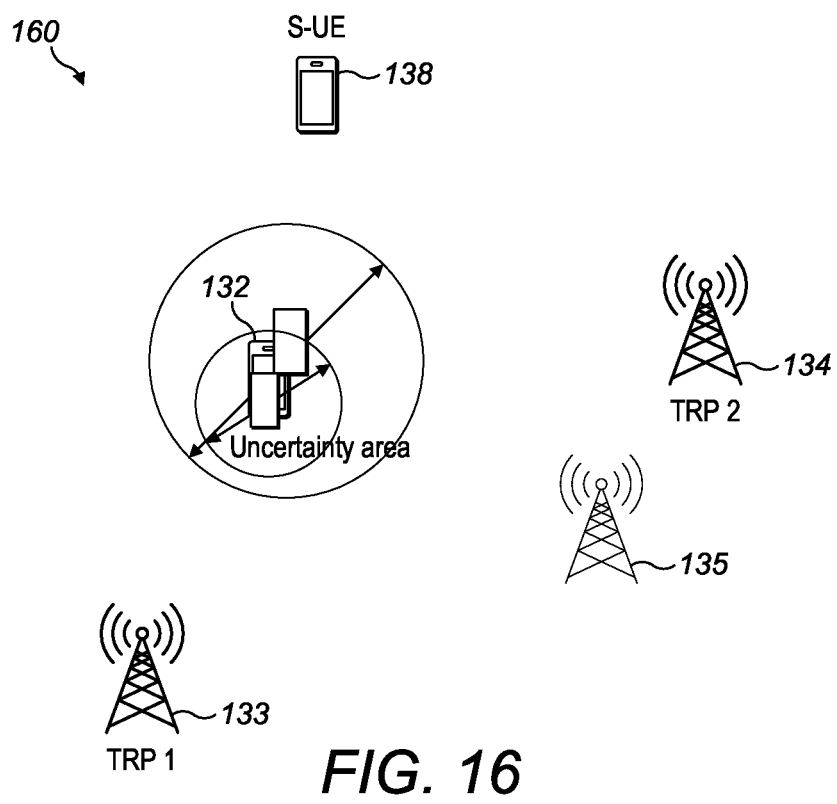

FIGS. 14 to 16 are block diagram of systems, indicated generally by the reference numerals 140 to 160 respectively, in accordance with an example embodiment.

The hierarchical position refinement described above with reference to FIG. 13 is depicted conceptually in FIGS. 14-16. As highlighted in FIGS. 14-16, the location of the target user device is sequentially updated and enhanced, such that the uncertainty area of the initial estimate (as shown in FIG. 14) based on the best TRP data is converted to a better estimate (as shown in FIG. 15) with the inclusion of positioning reference signals from the supportive user device 138, and is then converted to a further better estimate (as shown in FIG. 16) with the inclusion of positioning reference signals from a TRP which was not included at first step due to collinearity.

Figure 17:
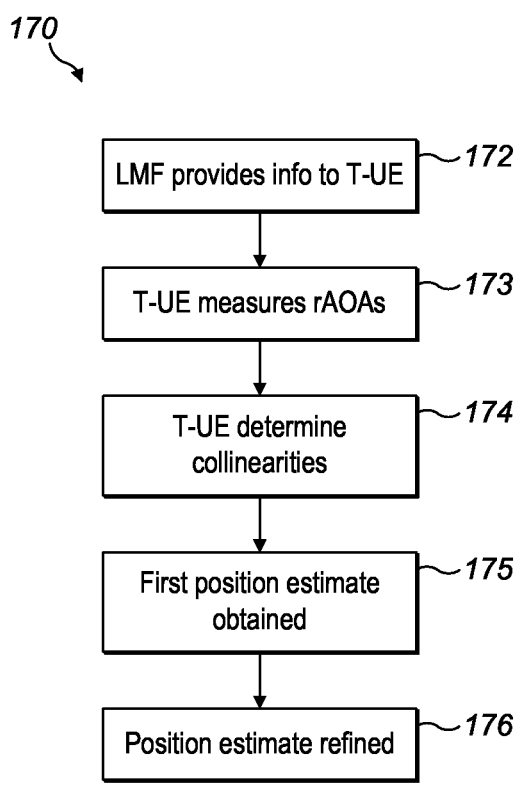
FIG. 17 is a flow chart showing a method in accordance with an example embodiment.

FIG. 17 is a flow chart showing a method, indicated generally by the reference numeral 170, in accordance with an example embodiment.

The method 170 starts at operation 172, where a location management function (LMF) provides information to a target user device (T-UE). That information may include coarse T-UE location information and can identify potential accuracy imperfections caused by bad geometry or low signal quality. Should such imperfections be identified, the LMF provides to the target user device, besides the usual assistance data and position calculation data, an indication of problematic geometry (e.g. high GDOP) and/or potential low signal quality.

The LMF may also provide one or more of:
  a list of neighbouring user devices that can serve as supportive UEs (S-UEs);
  information identifying nodes of the mobile communication system from which positioning reference signals should be obtained (e.g. measured);
  information identifying pairs of nodes of the mobile communication system for which relative angles of arrival should be determined; and
  position confidence information (e.g. position variance) for some or all of the mobile nodes of the mobile communication system.

At operation 173, the target user device (T-UE) obtains location information about the S-UEs including their position confidence level (i.e., location accuracy of S-UE).

The target UE measures the indicated PRS (e.g. TOA, AOA, RSRP etc.) and calculates the downlink relative AoAs (rAoA) as seen at the UE, specifically
  rAoA between any two TRPs
  rAoA between a TRP and a S-UE
  rAoA between two S-UEs For each of the relative angle of arrival determinations, the target UE assigns a collinearity level at operation 174 of the method 170. The collinearity levels characterize the relative geometry of the transmitting entities (i.e., TRPs or S-UEs) with respect to the current location of the target UE. For example, if rAOA is below a fixed threshold, the UE may classifies the TX pair as being collinear to the UE by assigning a collinearity level=1. Alternatively, multi collinearity levels based on multiple threshold checks may be defined.

At operation 175, the target user device selects the S-UEs that are expected to maximize the accuracy of its own location estimation, based on a process that includes at least the collinearity level (as obtained in the operation 174). For example, the T-UE selects the best TX (either TRP or S-UE based on collinearity levels above and signal quality) and computes a soft location estimate.

In operation 176, a refined position estimate is determined. The target user device uses the soft location estimate obtained in operation 175 and uses a downselected non-collinear set of S-UEs to produce the location refinement. Optionally, a further refinement may be implemented where the remaining transmitters are sequentially evaluated for viability and used to further reduce the uncertainty area of the location estimation.

Figure 18:
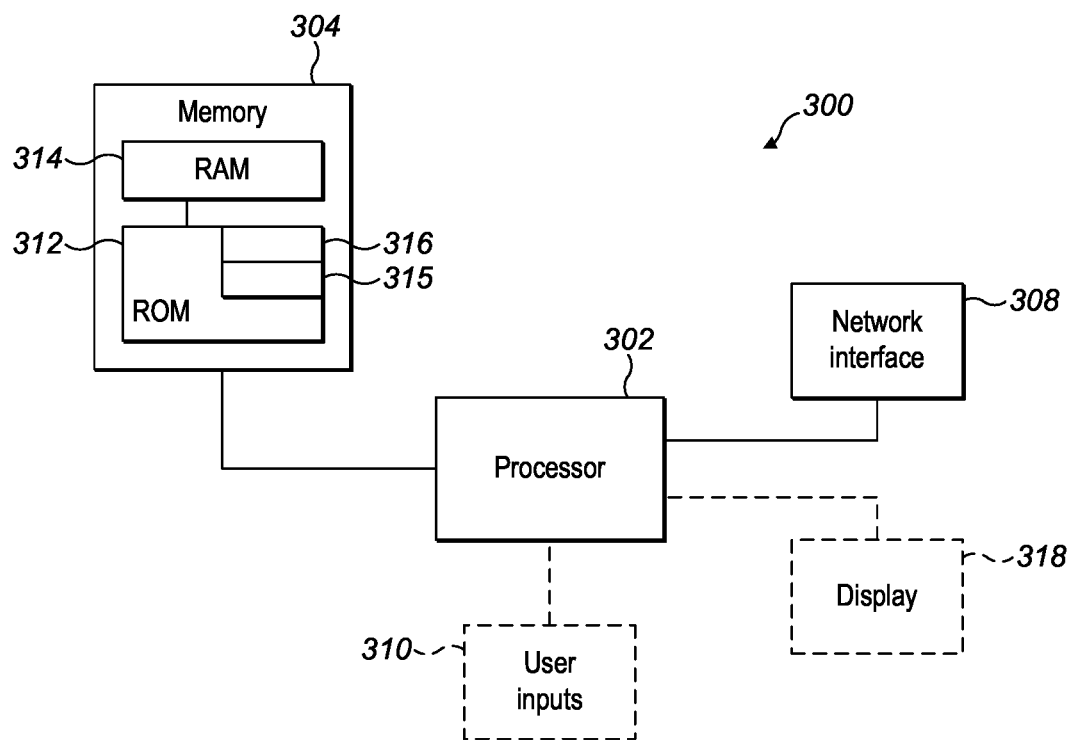
FIG. 18 is a block diagram of components of a system in accordance with an example embodiment.

For completeness, FIG. 18 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 20, 40, 92, 102, 110, 122 and 170 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 19:
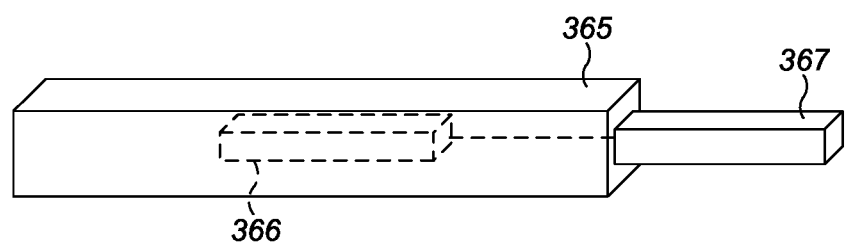
FIG. 19 shows tangible media storing computer-readable code which when run by a computer may perform methods according to example embodiments described above.

FIG. 19 shows tangible media, specifically a removable memory unit 365, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 4, 11 and 17 and the algorithms 92, 102 and 122 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code which, when executed by the at least one processor, causes the apparatus to perform:
   receiving, at a user device, positioning signals from each of a plurality of nodes of a mobile communication system, wherein the positioning signals comprise first positioning signals received from each of one or more fixed nodes of the mobile communication system and second positioning signals received from each of one or more mobile nodes of the mobile communication system, wherein said second positioning signals are provided from the one or more mobile nodes to said user device using one or more direct links between the one or more mobile nodes and the user device;
   determining, at the user device, for each pair of nodes of a plurality of pairs of said nodes, a respective relative angle of arrival of positioning signals received at the user device from the pair of nodes;
   determining, at the user device, for each pair of nodes of the plurality of pairs, a respective collinearity indication using the respective determined relative angle of arrival of the positioning signals received at the user device from the pair of nodes; and
   selecting, at the user device, one or more pairs of nodes of the plurality of pairs of nodes for use in determining or refining a position of the user device, wherein the selecting is based, at least in part, on determined collinearity of the selected one or more pairs of nodes with respect to a threshold level.

2. An apparatus as claimed in claim 1, wherein each relative angle of arrival comprises an angle of arrival difference between:
   first positioning signals received from different ones of the one or more fixed nodes;
   second positioning signals received from different ones of the one or more mobile nodes; or
   first positioning signals received from one of the one or more fixed nodes and second positioning signals received from one of the one or more mobile nodes.

3. An apparatus as claimed in claim 1, wherein selecting the one or more pairs of nodes of the plurality of pairs of nodes, is further based, at least in part, on received signal strength and/or position confidence.

4. An apparatus as claimed in claim 1, wherein the at least one memory and the computer program code are configured to, with the at least processor, cause the apparatus to:
   receive assistance data comprising one or more of:
   a coarse position estimate of the user device;

information identifying potential values of collinearity that are above a threshold level;
information identifying nodes of the mobile communication system from which positioning reference signals should be obtained;
information identifying pairs of nodes of the mobile communication system for which relative angles of arrival should be determined; or
position confidence information for some or all of the one or more mobile nodes of the mobile communication system.

5. An apparatus as claimed in claim 1, wherein:
some or all of the one or more mobile nodes are other user devices of the mobile communication system; and/or
some or all of the one or more fixed nodes are transmission reception points or base stations of said mobile communication system.

6. An apparatus as claimed in claim 1, wherein the at least one memory and the computer program code are configured to, with the at least processor, cause the apparatus to:
estimate or refine a position of the user device based on some or all of the selected one or more pairs of nodes.

7. An apparatus as claimed in claim 1, wherein the at least one memory and the computer program code are configured to, with the at least processor, cause the apparatus to:
cause a first position estimate to be generated based on first positioning signals received from selected pairs of the one or more fixed nodes; and
cause a second, refined, position estimate to be generated based on positioning signals from some or all of the selected one or more pairs of nodes.

8. An apparatus as claimed in claim 7, wherein the second position estimate is based on second positioning signals received from the one or more selected pairs of mobile nodes.

9. An apparatus as claimed in claim 7, wherein the at least one memory and the computer program code are configured to, with the at least processor, cause the apparatus to:
cause a third, further refined, position estimate to be generated using further nodes of the plurality of nodes.

10. An apparatus as claimed in claim 1, wherein at least one of the first positioning signals or the second positioning signals comprise positioning reference signals.

11. A method comprising:
receiving, at a user device, positioning signals from each of a plurality of nodes of a mobile communication system, wherein the positioning signals comprise first positioning signals received from each of one or more fixed nodes of the mobile communication system and second positioning signals received from each of one or more mobile nodes of the mobile communication system, wherein said second positioning signals are provided from the one or more mobile nodes to said user device using one or more direct links between the one or more mobile nodes and the user device;
determining, at the user device, for each pair of nodes of a first plurality of pairs of said nodes, a respective relative angle of arrival of positioning signals received at the user device from the pair of nodes;
determining, at the user device, for each pair of nodes of the first plurality of pairs, a respective collinearity indication using the respective determined relative angle of arrival of the positioning signals received at the user device from the pair of nodes; and
selecting, at the user device, one or more pairs of nodes of the plurality of pairs of nodes for use in positioning refinement, wherein the selecting is based, at least in part, on determined collinearity of the selected one or more pairs of nodes with respect to a threshold level.

12. A method as claimed in claim 11, wherein selecting at least some of the one or more of pairs of nodes, is further based, at least in part, on received signal strength and/or position confidence.

13. A method as claimed in claim 11, further comprising:
estimating or refining a position of the user device based on some or all of the selected one or more pairs of nodes.

14. A method as claimed in claim 11, further comprising:
causing a first position estimate to be generated based on first positioning signals received from selected pairs of fixed nodes; and
causing a second, refined, position estimate to be generated based on positioning signals from some or all of the selected one or more pairs of nodes.

15. A method as claimed in claim 14, wherein the second position estimate is based on second positioning signals received from selected pairs of the one or more mobile nodes.

16. A method as claimed in claim 14, further comprising:
causing a third, further refined, position estimate to be generated using further nodes of the plurality of nodes.

17. A non-transitory computer readable medium comprising program instructions stored thereon for performing at least the following:
receiving, at a user device, positioning signals from each of a plurality of nodes of a mobile communication system, wherein the positioning signals comprise first positioning signals received from each of one or more fixed nodes of the mobile communication system and second positioning signals received from each of one or more mobile nodes of the mobile communication system, wherein said second positioning signals are provided from the one or more mobile nodes to said user device using one or more direct link between the one or more mobile nodes and the user device;
determining, at the user device, for each pair of nodes of a plurality of pairs of said nodes, a respective relative angle of arrival of positioning signals received at the user device from the pair of nodes;
determining, at the user device, for each pair of nodes of the plurality of pairs, a respective collinearity indication using the respective determined relative angle of arrival of the positioning signals received at the user device from the pair of nodes; and
selecting, at the user device, one or more pairs of nodes of the plurality of pairs of nodes for use in positioning refinement, wherein the selecting is based, at least in part, on determined collinearity of the selected one or more pairs of nodes with respect to a threshold level.

18. An apparatus as claimed in claim 1, wherein the apparatus is the user device.

* * * * *